Sept. 11, 1934. F. B. KEALL 1,972,998
DRIVING AND STOPPING MECHANISM
Filed Oct. 16, 1931 4 Sheets-Sheet 1

Witness
Jas. J. Maloney.

Inventor
Frank B. Keall
by Van Everen Irish
Hildreth Hay Atty.

Sept. 11, 1934.  F. B. KEALL  1,972,998

DRIVING AND STOPPING MECHANISM

Filed Oct. 16, 1931  4 Sheets-Sheet 2

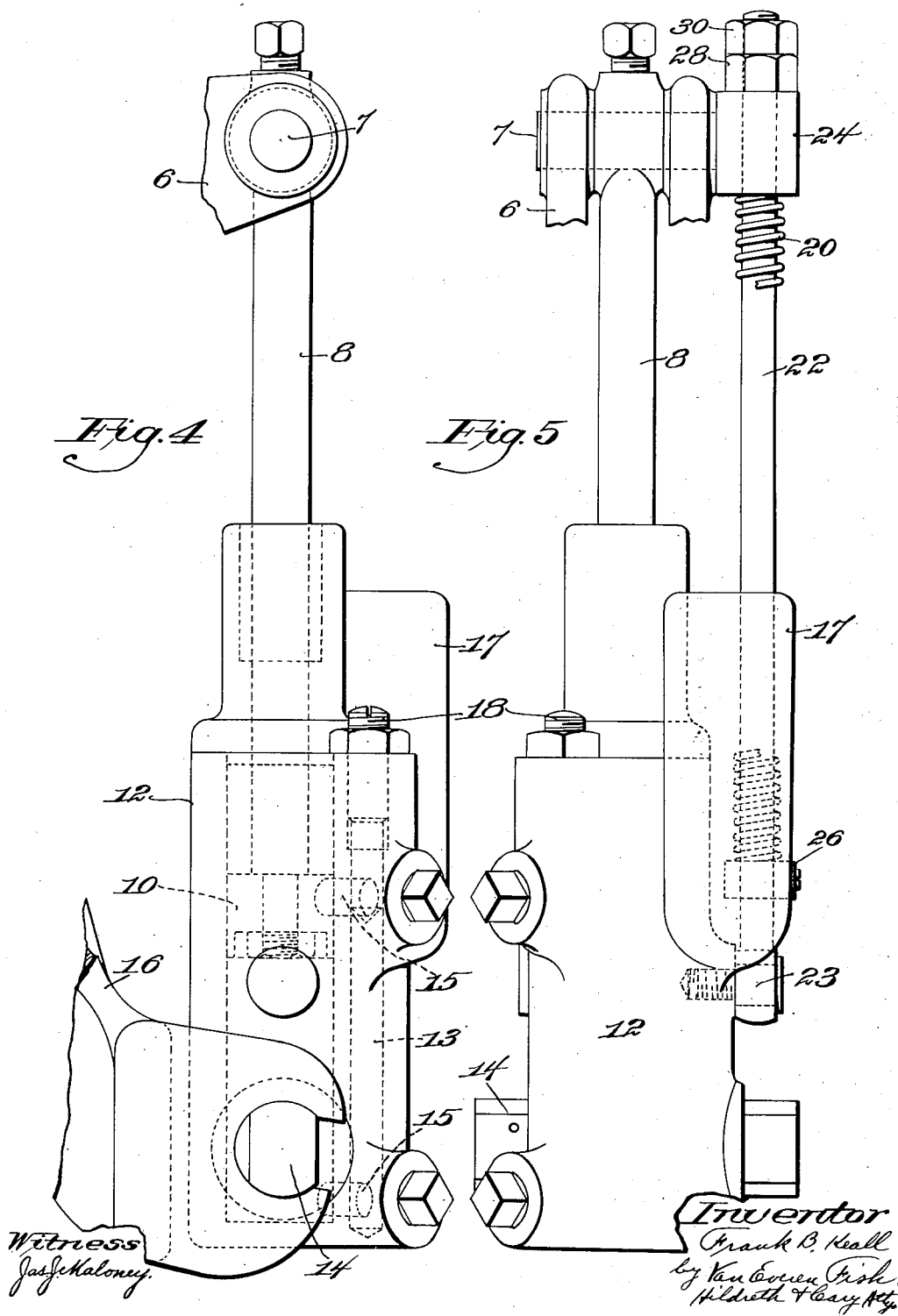

Sept. 11, 1934. F. B. KEALL 1,972,998
DRIVING AND STOPPING MECHANISM
Filed Oct. 16, 1931 4 Sheets-Sheet 4

Patented Sept. 11, 1934

1,972,998

UNITED STATES PATENT OFFICE 1,972,998

DRIVING AND STOPPING MECHANISM

Frank Bycroft Keall, Leicester, England, assignor to United Shoe Machinery Corporation, Paterson, N. J., a corporation of New Jersey Application October 16, 1931, Serial No. 569,157
In Great Britain November 8, 1930

15 Claims. (Cl. 192—149)

The present invention relates to driving and stopping mechanisms and is particularly, but by no means exclusively concerned with driving and stopping mechanisms including braking means which, when permitted by the operator of a machine, stop the machine at a predetermined point in the machine cycle. One type of mechanism operating in this manner is disclosed in the specification of British Letters Patent No. 720c of 1907 wherein a combined clutch and brake member is moved into engagement with a driving pulley to drive the machine and into engagement with a brake surface on a member fixed on the machine to stop the machine at a definite point in the machine cycle.

In a mechanism of this latter character the force with which the combined clutch-and-brake member is pressed against the braking surface is dependent upon the speed of the machine and the weight of the moving parts. It has been observed that if the machine be one such as is the curved hooked needle shoe sewing machine particularly referred to in the specification of British Letters Patent No. 332,313 which has a heavy assemblage of cams on a rotating driven cam shaft and if it be driven at a comparatively high speed, say 500 R. P. M. or more, the machine when stopped is stopped so suddenly by this particular type of clutch and brake mechanism that undue shock and strain are likely to be imposed on the clutch mechanism and on the moving parts of the machine. We have also observed that the pressure of the clutch and brake members in such a case together reacts to such an extent on the trip mechanism of the clutch, particularly in the form of the trip mechanism described in the specification of British Letters Patent No. 332,313, that the tripping of the clutch to throw the machine into operation may require excessive and undesirable effort on the part of the operator. Particularly is this so when the clutch is associated with a machine, such for instance as the sewing machine described in the latter specification, which it may be desired to operate at times in a series of single cycles by repeated tripping of the clutch.

It is one of the several objects of the present invention to overcome these difficulties by providing an improved form of mechanism whereby, although the machine may run at a comparatively high speed and comprise relatively heavy moving parts, it may be stopped in a definite position with a minimum of shock and strain and the clutch tripping mechanism yet be easily actuated to restart the machine.

The above and other objects and the several features of the present invention will become apparent to those skilled in the art from a consideration of the following description, given by way of example, of a preferred form of mechanism according to the present invention and of an alternative form of tripping mechanism which will be described by way of illustration as being applied to the clutch shown in the specification of British Letters Patent No. 332,313 and assumed to be embodied in a sewing machine of the construction and for the purpose of that particularly referred to in the latter specification.

In the accompanying drawings:

Figure 4 is a right-hand side elevation of a dash-pot associated with the said mechanism but shown on the drawings as being vertical instead of somewhat inclined;

Figure 5 is a rear elevation of said dash-pot;

Figure 7:
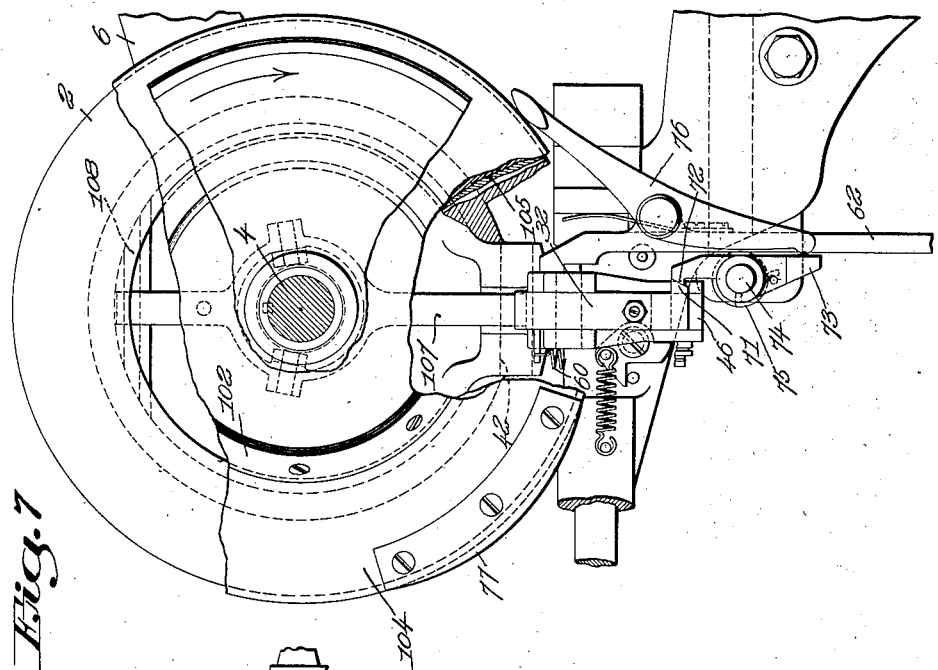
Figure 7 is an elevation of the parts shown in Figure 6 when viewed from the right.
Figure 6:
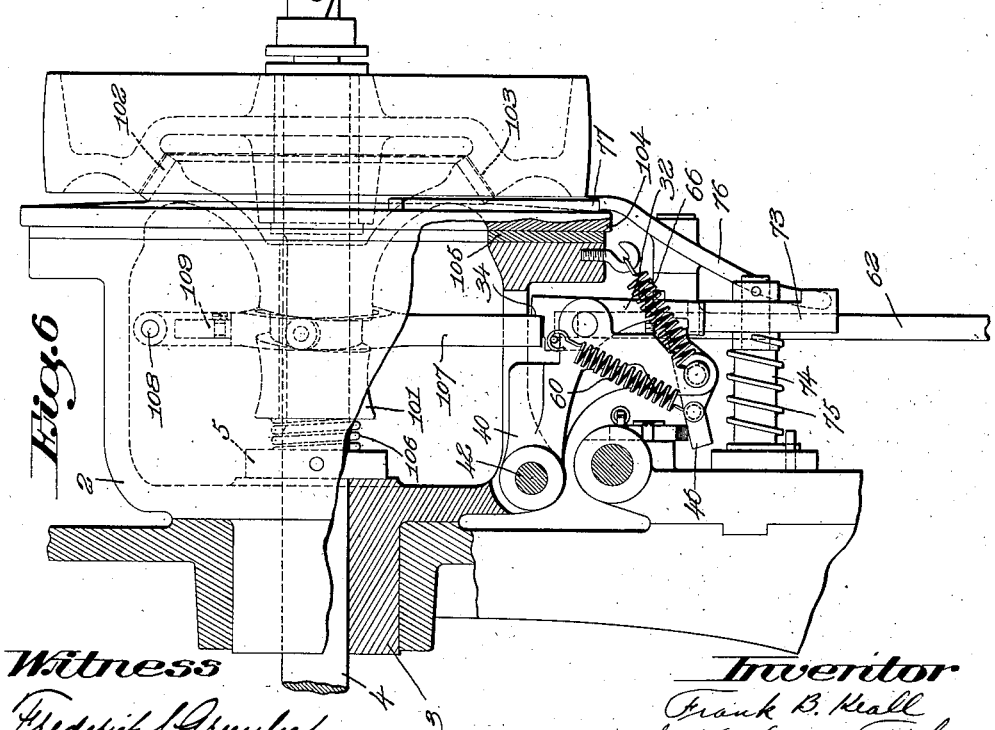
Figure 6 is a front elevation, partly in section, showing an alternative form of tripping mechanism with the parts thereof in a similar position to that of those shown in Figure 1.

The driving and stopping mechanism illustrated in the drawings comprises a combined clutch and brake member similar to that disclosed in the patents above referred to and best illustrated in Figures 6 and 7. This member is indicated at 101 and is mounted to rotate with and slide longitudinally on the driven sewing cam shaft 4. The clutch surface of the member 101 is indicated at 102 and is arranged to engage a cooperating clutch surface 103 on the driving pulley which is mounted to turn loosely on the shaft 4. The braking surface of the member 101 is indicated at 104 and is arranged to engage a cooperating braking surface 105 on the member 2 mounted on the machine frame, as hereinafter described. Movement of the member 101 longitudinally of the shaft 4 to the right, as viewed in Figure 6, closes the clutch by engaging the surfaces 102 and 103 and movement of the member 101 in the opposite direction opens the clutch and brings the braking surfaces 104 and 105 into engagement. The member 101 is moved towards the right, as viewed in Figure 6, by means of a spring 106 surrounding the shaft 4 and interposed between the member 101 and a collar 5 secured to the shaft. To open the clutch and bring the braking surfaces into engagement, mechanism actuated by the member 101 and controlled by the operator through connections from a starting and stopping treadle is provided. This mechanism is substantially the same as that disclosed in the patents above referred to and comprises a vertically arranged member 107 arranged to oscillate about a vertical axis and to have a to and fro vibratory movement about a fixed horizontal pivotal axis, indicated at 108. The member 107 is shaped midway its length to surround the member 101 and is provided with inwardly projecting pins upon which rolls are mounted engaging a continuous obliquely disposed cam surface formed in the member 101. This cam surface is shaped to impart vibrating movements to the member 107 about the pivotal axis 108 and an oscillating movement about a vertical axis, these latter movements being permitted by a swivel joint 109 formed in the member 107 below the pivotal axis 108. While the cam shaft 4 is being driven with the clutch in its closed position, the member 107 is vibrated idly. To open the clutch and stop the shaft, a trip member is provided which engages the lower end of the member 107 and holds it in its extreme position to the left, as indicated in Figure 6, so that during the continued rotation of the shaft 4, the clutch and brake member 101 is moved to the left by the cooperative action of the cam surfaces in the member and the rolls on the member 107 engaging the cam surfaces, this movement being continued until the braking surfaces 104 and 105 are brought firmly into engagement and the member 101, together with the cam shaft 4, are brought to rest.

As so far described, the mechanism is substantially the same as that disclosed in the patents above referred to. In the preferred form of mechanism shown in the drawings, the member 2 which carries the brake surface 105, instead of being fixed to the frame of the machine is pivoted thereto so that it can swing about the axis of the driving and sewing cam shaft 4. The member 2 has projecting from it a hub 3 rotatably mounted in the frame of the machine and the member 2 is prevented from moving axially of the driving shaft 4 by a collar 5 fixed on the shaft. The member 2 has extending rearwardly from it an arm 6 which is pivotally connected by a pivot 7 to the upper end of a piston rod 8, the lower end of which carries a piston 10 (see Figure 4). The piston 10 slides in a cylinder in a dash-pot 12 pivotally mounted at 14 on a bracket 16 fixed to the machine frame to swing forwardly or rearwardly thereof when viewed from the front. The dash-pot 12 may be of any well known construction and is herein shown and described by way of illustration as having in it a passage 13 which is connected, by ports 15, 15 above and below the piston, to the cylinder. The cylinder is filled with oil and the dash-pot 12 is provided with a closed overflow chamber, indicated at 17, to receive oil from the upper end of the cylinder which is displaced by the piston rod 8 as it enters the cylinder when the piston 10 is being moved down. When in the stopping of the machine the clutch-and-brake member is pressed against the brake surface the member 2 which carries the brake surface is rotated about the driving shaft axis by the momentum of the machine parts until they are arrested by the dash-pot. The resistance in the dash-pot may be regulated by a screw 18 which may be adjusted to extend more or less into one of the ports 15. The member 2 which carries the brake surface is returned by a spring 20 surrounding a rod 22 which is substantially parallel to the piston rod 8 and which is pivotally connected at its lower end at 23 to the dash-pot 12. The upper end of the rod 22 passes through an extension 24 of the pivot 7 which connects the upper end of the piston rod 8 to the brake-surface-carrying member 2. The spring 20 is confined between the extension 24 of the pivot 7 and an adjustable collar 26 fixed at the lower end of the rod 22. A nut 28 and a lock-nut 30 at the upper end of the rod 22 and above the extension 24 of the pivot 7 limit the return movement of the brake-surface-carrying member 2 by the spring 20.

Figure 1:
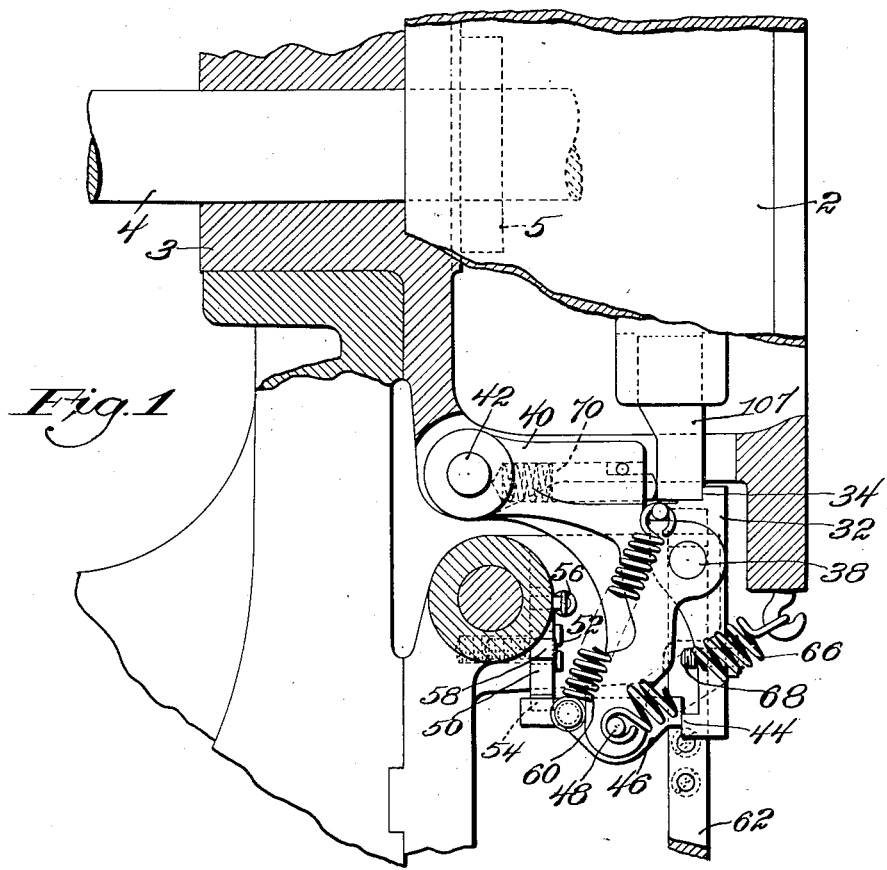
Figure 1 is a front elevation, partly in section, of said preferred form of mechanism with the parts in a position they occupy after the clutch tripping treadle has been released to stop the machine and before the machine finally comes to rest.
Figure 2:
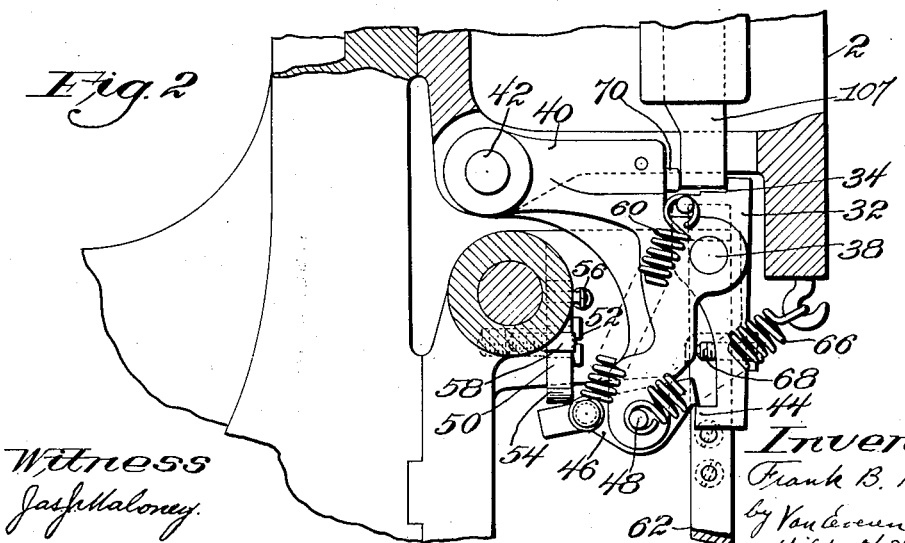
Figure 2 is a view similar to Figure 1 but with the parts in the relative positions they occupy when the machine is stopped.
Figure 3:
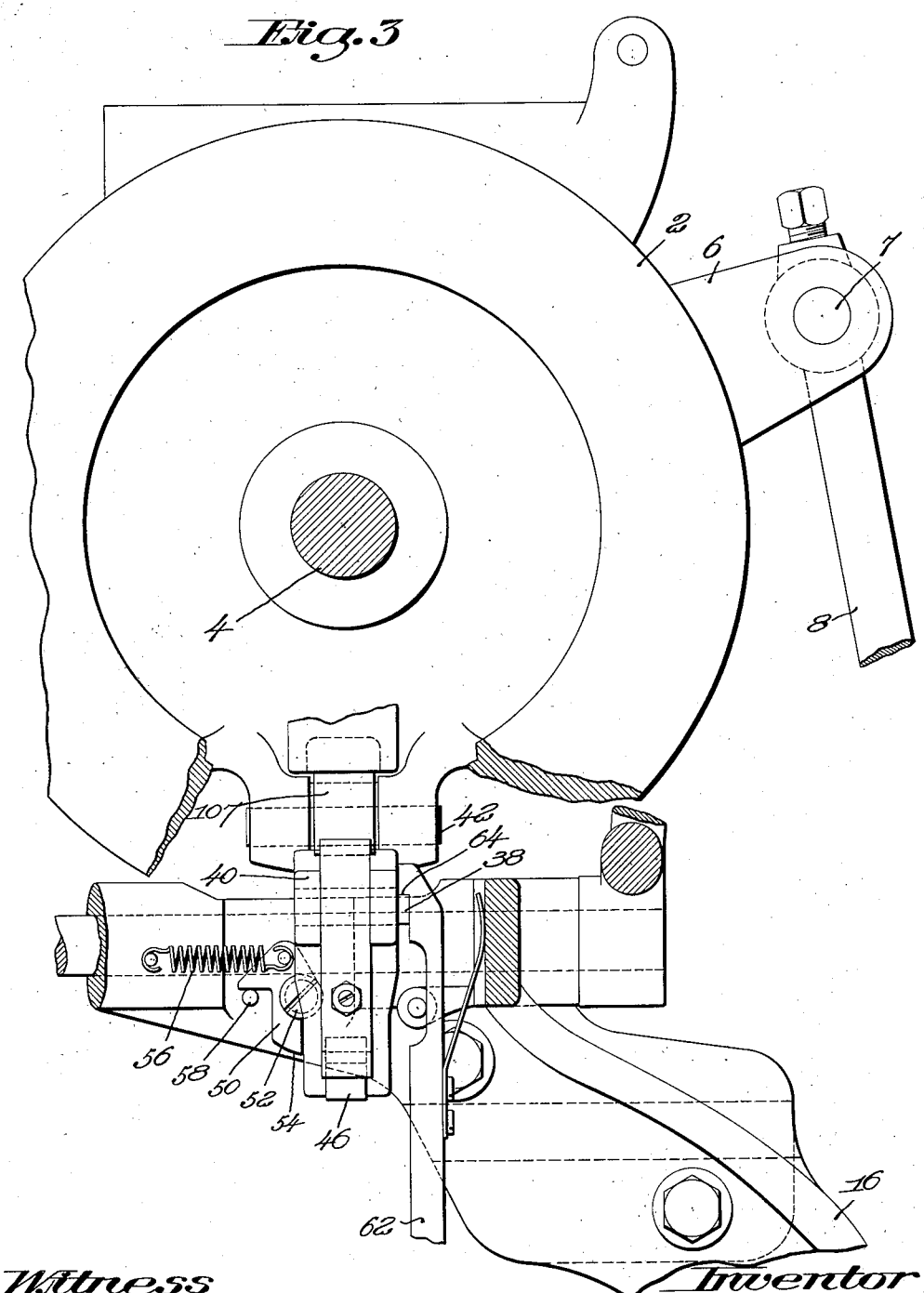
Figure 3 is an elevation, partly in section, of the parts shown in Figures 1 and 2 in the stopping position of the parts as viewed from the right of Figures 1 and 2.

The mechanism for tripping the clutch (see Figures 1, 2 and 3) comprises a trip member 32 which has formed on it at its upper end a shoulder 34 adapted to be engaged by the lower end of the member 107. The trip member 32 is pivoted on a horizontal pin 38 extending forwardly and rearwardly of the machine which is carried by a trip arm 40 pivoted to the brake-surface-carrying member 2 on a shaft 42 parallel to the pin 38. The shoulder 34 on the trip member 32 is above its pivot 38 and the member extends downwardly and has at its lower end a projection 44 extending to the left, when viewing the machine from the front. The projection 44 is engaged by the right-hand end of a latch 46 extending substantially horizontally across the machine and pivoted on a horizontal stud 48 extending fore and aft of the machine and carried by the trip arm 40. The left-hand end of the latch is arranged to move beneath and rotate a tumbler 50, pivoted on the machine frame on a horizontal stud 52 extending across the machine, when the brake-surface-carrying member 2 is swung about the axis of the driving shaft 4 by the momentum of the machine parts as hereinbefore described. As the latter member swings back, under the influence of the spring 20, the latch 46 engages a cam face 54 on the tumbler 50 and its left-hand end is thereby depressed and its right-hand end raised to release it from the projection 44 on the lower end of the trip member 32. The tumbler 50 after being rotated is returned by a spring 56, connected to the tumbler and the frame, against a stop pin 58 in the frame. The left-hand end of the latch 46 is held up by a spring 60 connected to that end of the latch and to the upper end of the trip member 32, the latter spring also holding the upper end of the trip member 32 against a stop face on the trip arm 40 when the machine is being operated.

The trip arm 40 is drawn down to start the machine by a treadle operated rod 62 which at its upper end has a hook 64 extending over the end of the pivot pin 38 of the trip member 32 and is returned when the treadle is released by a spring 66 connected to it and to the brake-surface-carrying member 2. When the treadle is released the trip member 32 is moved up by the trip arm spring 66 into the path of the lower end of the member 107 and as this end moves to the right, viewing the machine from the front, it engages and is stopped by the shoulder 34 on the trip member 32. The clutch is then released and the brake applied, as hereinbefore described. The momentum of the parts then causes the brake-surface-carrying member 2 to be rotated about the axis of the driving shaft 4 until arrested by the dash-pot and returned by the return spring 20 hereinbefore referred to. The trip arm 40, trip member 32 and latch 46 all move with the brake-surface-carrying member 2 and during the movement of this member by the momentum of the parts the latch 46 moves under and rotates the tumbler 50 without being rotated on its pivot 48 thereby but during the return movement of the brake-surface-carrying member 2 the latch 46 is tipped on its pivot 48 by the cam face 54 on the tumbler, which has meantime been returned against the stop pin 58 by its spring 56, and the latch 46 is released from the projection 44 on the trip member 32. The releasing of the latch 46 allows the lower end of the member 107 to move in the same direction as it moves when the clutch is tripped to close and release the brake. The movement however in this direction is very small and is limited by an adjustable screw 68 threaded through the trip member 32 and engaging the trip arm 40. The movement is only sufficient to partly relieve the pressure between the braking surfaces and at the same time somewhat relieves the pressure between the lower end of the member 107 and the shoulder 34 on the trip member 32 and consequently allows the trip member to be easily drawn down to release the lower end of the member 107 and trip the clutch.

If the shoulder 34 on the trip member 32 and the lower end of the member 107 do not for any reason fully engage one another when the treadle is released to stop the machine they may when pressed together as the brake operates become separated and the machine then complete an additional and undesired revolution with perhaps injury to the operator or damage to the machine or the work being operated upon. To prevent this happening there is provided in the preferred form of clutch mechanism now being described a substantially horizontal spring plunger 70 slidingly mounted in the trip arm 40 and arranged, when the clutch is tripped, to slide part way towards the shoulder 34 on the trip member 32 and beneath the lower end of the member 107. Either the plunger 70, when it moves towards the shoulder 34, or the upper face of the trip member 32 prevents the trip arm 40 from rising to stop the machine, when the treadle is released, by engaging the under face of the member 107 and the plunger 70 must be moved back before the trip arm 40 can rise high enough to allow the lower end of the member 107 and the shoulder 34 on the trip member 32 to engage at the proper time in the cycle of the machine. The plunger 70 is moved back by the lower end of the member 107 as, after moving to the right beyond the end of the plunger 70 and therefore allowing the trip arm 40 to move up somewhat until stopped by the engagement of the upper face of the trip member 32 with the under face of the member 107, it moves to the left and pushes back the plunger 70. When under these conditions the member 107 has moved to the left beyond the shoulder 34 the trip arm 40 can and does rise fully and as the lower end of the member 107 moves again to the right it engages the shoulder 34 on the trip member and the machine is stopped.

In the alternative form of clutch tripping mechanism shown in Figures 6 and 7 the plunger 70 is dispensed with and the lower end of the trip member 32 has formed on it a hook 71 (see Figure 7) which, when the trip member 32 is pulled down by the rod 62 as hereinbefore described to close the clutch, is engaged by a hook 72 formed on a latch 73 pivoted on a pin 74 fixed in the machine frame. The latch 73 is urged about the pin 74 in a direction to engage the hook 72 with the hook 71 by a coil spring 75 surrounding the pin 74 which is connected at one end to the frame and at the other end to the latch. The rod 62 has pivoted on it a lever 76 the lower arm of which is arranged to engage the latch 73 and the upper arm of which is arranged to be engaged by a cam 77 fixed on the clutch and brake member hereinbefore referred to. The hook 72 engages the hook 71 just after the trip member has been drawn down by the treadle rod below the lower end of the member 107 so that the trip member cannot rise into engagement with the member 107 until the hooks 71, 72 have been disengaged. The disengagement of the hooks is effected by the cam 77 and cam lever 76 which latter when the rod 62 is allowed to rise rises with it and when its upper end arrives in the path of the cam 77 the cam lever 76 is rocked on its pivot by the cam and its lower end rocks the latch 73 and disengages the hook 72 from the hook 71. The trip member can then be raised by the spring 66 to bring the shoulder 34 on the trip member 32 into the path of the member 107 to stop the machine as hereinbefore described. The cam lever 76 and cam 77 are so arranged that when the hooks 71 and 72 are disengaged as above described the lower end of the member 107 is at the left-hand end of its path of movement so that the trip member can rise fully thus ensuring that the shoulder 34 and member 107 shall fully engage as the member 107 moves to the right and that the machine will not complete an additional and undesired revolution as hereinbefore referred to.

The nature and scope of the invention having been indicated and an embodiment of the invention having been specifically described, what is claimed is:

1. A driving and stopping mechanism having, in combination, a driven shaft, a brake member rotated by the shaft, a braking member adapted to engage therewith to stop the shaft mounted for limited rotary movement with the shaft when said members are engaged, mechanism acting when thrown into operation to engage said members, yielding means for arresting said second named braking member during the braking action of said members, and means acting after the braking action has ceased to relieve the pressure of the braking members.

2. A driving and stopping mechanism having, in combination, a driven shaft, a brake member rotated by the shaft, a braking member adapted to engage therewith to stop the shaft mounted for limited rotary movement with the shaft when said members are engaged, mechanism acting when thrown into operation to engage said members, yielding means for arresting said second named braking member during the braking action of said members and for thereafter reversing the rotation of the shaft, and means actuated during such reverse rotation to relieve the pressure of the braking members.

3. A driving and stopping mechanism having, in combination, a driven shaft, a brake member rotated by the shaft, a brake member cooperating therewith to stop the shaft mounted for limited rotary movement with the shaft when the brake members are engaged, mechanism acting when thrown into operation to engage said members, yielding means for resisting said rotary movement during the braking action, and means acting after the braking action has ceased to relieve the pressure of the braking members.

4. A driving and stopping mechanism having, in combination, a driven shaft, a brake member rotated by the shaft, a brake member cooperating therewith to stop the shaft mounted for limited rotary movement with the shaft when the brake members are engaged, mechanism acting when thrown into operation to engage said members, yielding means for resisting said rotary movement during the braking action and for thereafter returning the cooperating brake member to its original position, and means actuated during such return movement to relieve the pressure of the braking members.

5. A starting and stopping mechanism having, in combination, a driven shaft, a brake member rotated by the shaft, a brake member cooperating therewith to stop the shaft, means actuated by the shaft to engage said members comprising a vibrating member and means driven by the shaft and cooperating with said vibrating member when held from vibration to move said brake members into engagement, a trip member to engage said vibrating member, and means acting after the braking action has ceased to release the trip member and permit a slight movement of said vibrating member while still held by the trip member.

6. A starting and stopping mechanism having, in combination, a driven shaft, a brake member rotated by the shaft, a brake member cooperating therewith to stop the shaft, means actuated by the shaft to engage said members comprising a vibrating member, and means driven by the shaft and cooperating with said vibrating member when held from vibration to move said brake members into engagement, a trip member to engage said vibrating member, and means for causing the trip member to move into operative position in timed relation to the movement of the vibrating member.

7. A starting and stopping mechanism having, in combination, a driven shaft, a brake member rotated by the shaft, a brake member cooperating therewith to stop the shaft, means actuated by the shaft to engage said members comprising a vibrating member, and means driven by the shaft and cooperating with said vibrating member when held from vibration to move said brake members into engagement, a trip member to engage said vibrating member, a treadle controlled trip arm on which said trip member is mounted, and means for preventing movement of the trip member into operative position comprising a spring-pressed plunger mounted in the trip arm, arranged to engage the vibrating member and to be moved into inoperative position by the movement of the vibrating member out of the path of the trip member.

8. A starting and stopping mechanism having, in combination, a driven shaft, a brake member rotated by the shaft, a brake member cooperating therewith to stop the shaft, means actuated by the shaft to engage said members comprising a vibrating member, and means driven by the shaft and cooperating with said vibrating member when held from vibration to move said brake members into engagement, a trip member to engage said vibrating member, and means for preventing movement of the trip member into operative position while the vibrating member is moving towards the trip member.

9. A starting and stopping mechanism having, in combination, a driven shaft, a brake member rotated by the shaft, a brake member cooperating therewith to stop the shaft, means actuated by the shaft to engage said members comprising a vibrating member, and means driven by the shaft and cooperating with said vibrating member when held from vibration to move said brake members into engagement, a trip member to engage said vibrating member, means for holding the trip member in inoperative position, and means actuated by the shaft for releasing the trip member to allow it to move into operative position.

10. A starting and stopping mechanism having, in combination, a driven shaft, a brake member rotated by the shaft, a brake member cooperating therewith to stop the shaft, means actuated by the shaft to engage said members comprising a vibrating member, and means driven by the shaft and cooperating with said vibrating member when held from vibration to move said brake members into engagement, a trip member to engage said vibrating member, a latch to hold the trip member in operative position, and means for actuating the latch after the braking action has ceased to release the trip member and permit a slight movement of said vibrating member while still held by the trip member.

11. A starting and stopping mechanism having, in combination, a driven shaft, a brake member rotated by the shaft, a brake member cooperating therewith to stop the shaft, mounted for limited rotary movement with the shaft when the brake members are engaged, means actuated by the shaft to engage said members comprising a vibrating member, and means driven by the shaft and cooperating with said vibrating member when held from vibration to move said brake members into engagement, a trip member to engage said vibrating member, yielding means for resisting said rotary movement during the braking action and for thereafter returning the cooperating brake member to its original position, and means actuated during such return movement to release the trip member and permit a slight movement of said vibrating member while still held by the trip member.

12. A starting and stopping mechanism having, in combination, a driven shaft, a brake member rotated by the shaft, a brake member cooperating therewith to stop the shaft mounted for a limited rotary movement with the shaft when the brake members are engaged, means actuated by the shaft to engage said members comprising a vibrating member and means driven by the shaft and cooperating with said vibrating member when held from vibration to move said brake members into engagement, a trip member to engage said vibrating member, a latch to hold the trip member in operative position, yielding means for resisting said rotary movement during the braking action and for thereafter returning the cooperating brake member to its original position, and means for actuating the latch during such return movement to release the trip member and permit a slight movement of said vibrating member while still held by the trip member.

13. A driving and stopping mechanism having, in combination, a driving clutch member, a driven shaft, a combined driven clutch and brake member rotated by the shaft, a brake member adapted to engage with said combined clutch and brake member to stop the shaft mounted for limited rotary movement with the shaft when the brake members are engaged, means for moving said combined clutch and brake member to engage the driving clutch member, mechanism acting when thrown into operation to engage said brake members, and yielding means for resisting said rotary movement during the braking action.

14. A driving and stopping mechanism having, in combination, a driven shaft, a brake member rotated by the shaft, a brake member cooperating therewith to stop the shaft mounted for limited rotary movement with the shaft when the brake members are engaged, a vibrating member, means driven by the shaft and cooperating with said vibrating member when held from vibration to move said brake members into engagement, a trip member to engage said vibrating member, and yielding means for resisting said rotary movement during the braking action.

15. A driving and stopping mechanism having, in combination, a driven shaft, a brake member rotated by the shaft, a brake member cooperating therewith to stop the shaft mounted for limited rotary movement with the shaft when the brake members are engaged, a vibrating member, means driven by the shaft and cooperating with said vibrating member when held from vibration to move said brake members into engagement, a trip member to engage said vibrating member, and means comprising a fluid dash pot for resisting said rotary movement during the braking action.

FRANK BYCROFT KEALL.